United States Patent [19]
McGrady

[11] Patent Number: 5,998,060
[45] Date of Patent: *Dec. 7, 1999

[54] SNAP CONNECTION BATTERY SYSTEM

[76] Inventor: Carl McGrady, 117 Augusta St., Florence, Ala. 35633

[ * ] Notice: This patent issued on a continued prosecution application filed under 37 CFR 1.53(d), and is subject to the twenty year patent term provisions of 35 U.S.C. 154(a)(2).

[21] Appl. No.: 08/839,955

[22] Filed: Apr. 24, 1997

[51] Int. Cl.$^6$ ....................................... H01M 2/26
[52] U.S. Cl. .................... 429/121; 429/123; 429/157; 429/178
[58] Field of Search ..................... 429/123, 157, 429/170, 178, 121

[56] References Cited

U.S. PATENT DOCUMENTS

| | | | |
|---|---|---|---|
| 1,117,006 | 11/1914 | Doran ................................. | 429/121 X |
| 2,225,460 | 12/1940 | Porth ................................. | 429/123 |
| 2,702,309 | 2/1955 | Oppenheim ...................... | 429/123 X |
| 2,983,899 | 5/1961 | Amodio et al. .................. | 429/121 X |
| 4,002,808 | 1/1977 | Fafa ................................. | 429/157 |
| 4,229,686 | 10/1980 | Mullersman et al. ........... | 429/121 X |
| 5,104,752 | 4/1992 | Baughman et al. ............. | 429/178 X |

Primary Examiner—John S. Maples

[57] ABSTRACT

A new snap connection battery system that makes it easier to install batteries in the correct direction within electronic components. The inventive device includes a battery having a battery body with first and second opposite ends, a positive terminal located at the first end and a negative terminal located at the second end. The positive terminal comprises a male member projecting from the first end with either an annular rib or a plurality of spaced dimples formed on an exterior surface of the male member. The negative terminal comprises a female recess extending into the battery body from the second end with either an annular groove or a plurality of spaced indentations formed in the side wall which defines the recess. The battery is connected with adjacent batteries which are similarly shaped by inserting the male member into the female recess of an adjacent battery, and inserting a male member of an additional adjacent battery into the female recess of the first battery. Adapter caps are provided so as to allow use of the batteries within conventional electronic equipment.

2 Claims, 2 Drawing Sheets

SNAP CONNECTION BATTERY SYSTEM

BACKGROUND OF THE INVENTION

1. Field of the Invention

The present invention relates to batteries and more particularly pertains to a new snap connection battery system that makes it easier to install batteries in the correct direction within electronic components.

2. Description of the Prior Art

The use of batteries is known in the prior art. More specifically, batteries heretofore devised and utilized are known to consist basically of familiar, expected and obvious structural configurations, notwithstanding the myriad of designs encompassed by the crowded prior art which have been developed for the fulfillment of countless objectives and requirements.

Known prior art batteries include U.S. Pat. Nos. 3,992,227; 3,933,522; 3,980,387; 4,394,059; and 4,943,498.

While these devices fulfill their respective, particular objectives and requirements, the aforementioned patents do not disclose a new snap connection battery system. The inventive device includes a battery having a battery body with first and second opposite ends, a positive terminal located at the first end and a negative terminal located at the second end. The positive terminal comprises a male member projecting from the first end with either an annular rib or a plurality of spaced dimples formed on an exterior surface of the male member. The negative terminal comprises a female recess extending into the battery body from the second end with either an annular groove or a plurality of spaced indentations formed in the side wall which defines the recess. The battery is connected with adjacent batteries which are similarly shaped by inserting the male member into the female recess of an adjacent battery, and inserting a male member of an additional adjacent battery into the female recess of the first battery. Adapter caps are provided so as to allow use of the batteries within conventional electronic equipment.

In these respects, the snap connection battery system according to the present invention substantially departs from the conventional concepts and designs of the prior art, and in so doing provides an apparatus primarily developed for the purpose of making it easier to install batteries in the correct direction within electronic components.

SUMMARY OF THE INVENTION

In view of the foregoing disadvantages inherent in the known types of batteries now present in the prior art, the present invention provides a new snap connection battery system construction wherein the same can be utilized for making it easier to install batteries in the correct direction within electronic components.

The general purpose of the present invention, which will be described subsequently in greater detail, is to provide a new snap connection battery system apparatus which has many of the advantages of the batteries mentioned heretofore and many novel features that result in a new snap connection battery system which is not anticipated, rendered obvious, suggested, or even implied by any of the prior art batteries, either alone or in any combination thereof.

To attain this, the present invention generally comprises a battery having a battery body with first and second opposite ends, a positive terminal located at the first end and a negative terminal located at the second end. The positive terminal comprises a male member projecting from the first end with either an annular rib or a plurality of spaced dimples formed on an exterior surface of the male member. The negative terminal comprises a female recess extending into the battery body from the second end with either an annular groove or a plurality of spaced indentations formed in the side wall which defines the recess. The battery is connected with adjacent batteries which are similarly shaped by inserting the male member into the female recess of an adjacent battery, and inserting a male member of an additional adjacent battery into the female recess of the first battery. Adapter caps are provided so as to allow use of the batteries within conventional electronic equipment.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new snap connection battery system apparatus which has many of the advantages of the batteries mentioned heretofore and many novel features that result in a new snap connection battery system which is not anticipated, rendered obvious, suggested, or even implied by any of the prior art batteries, either alone or in any combination thereof.

It is another object of the present invention to provide a new snap connection battery system which may be easily and efficiently manufactured and marketed.

It is a further object of the present invention to provide a new snap connection battery system which is of a durable and reliable construction.

An even further object of the present invention is to provide a new snap connection battery system which is susceptible of a low cost of manufacture with regard to both materials and labor, and which accordingly is then susceptible of low prices of sale to the consuming public, thereby making such snap connection battery system economically available to the buying public.

Still yet another object of the present invention is to provide a new snap connection battery system which provides in the apparatuses and methods of the prior art some of the advantages thereof, while simultaneously overcoming some of the disadvantages normally associated therewith.

Still another object of the present invention is to provide a new snap connection battery system that makes it easier to install batteries in the correct direction within electronic components.

Yet another object of the present invention is to provide a new snap connection battery system which includes a battery having a battery body with first and second opposite ends, a positive terminal located at the first end and a negative terminal located at the second end. The positive terminal comprises a male member projecting from the first end with either an annular rib or a plurality of spaced dimples formed on an exterior surface of the male member. The negative terminal comprises a female recess extending into the battery body from the second end with either an annular groove or a plurality of spaced indentations formed in the side wall which defines the recess. The battery is connected with adjacent batteries which are similarly shaped by inserting the male member into the female recess of an adjacent battery, and inserting a male member of an additional adjacent battery into the female recess of the first battery. Adapter caps are provided so as to allow use of the batteries within conventional electronic equipment.

Still yet another object of the present invention is to provide a new snap connection battery system that makes it easier to identify the positive and negative ends of a battery.

Even still another object of the present invention is to provide a new snap connection battery system that makes it easier to handle a large number of batteries.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
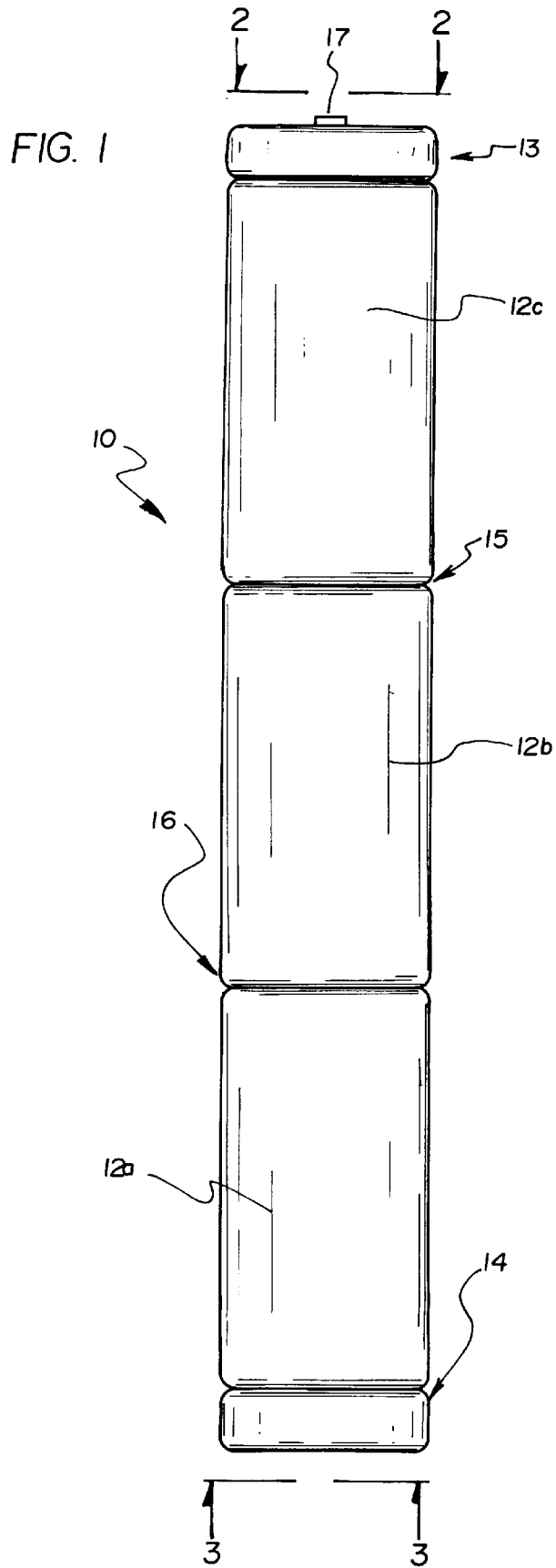
FIG. 1 is a side view of a new snap connection battery system according to the present invention.

With reference now to the drawings, and in particular to FIGS. 1 through 5 thereof, a new snap connection battery system embodying the principles and concepts of the present invention and generally designated by the reference numeral 10 will be described.

As best illustrated in FIG. 1, the snap connection battery system 10 comprises a series of batteries 12a,b,c snap connected together in a manner to be later described, with adapters caps 13,14 located at each end allowing the batteries to be used in conventional electronic equipment. The batteries 12a–c can be any type and size of dry cell battery, such as AA, AAA, C, D, etc.

Each battery 12a–c includes a first, positive end 15 and a second, negative end 16 opposite the end 15. The end 15 includes a snap connection positive terminal extending therefrom, while the end 16 includes a snap connection negative terminal, each of which will be later described.

Figure 2:
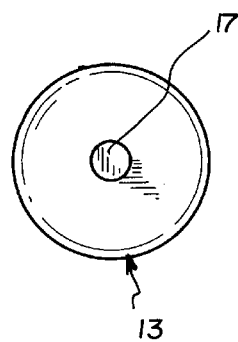
FIG. 2 is a top view taken along line 2—2 of FIG. 1.
Figure 3:
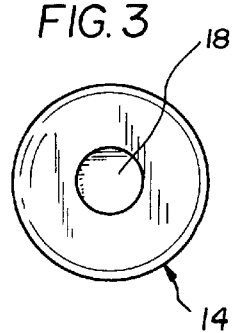
FIG. 3 is a bottom view taken along line 3—3 of FIG. 1.

Additionally, as shown in FIGS. 1–3, the adapter cap 13 is connected to the positive end 15 of the battery 12c. The cap 13 includes a positive terminal 17 on one end thereof which is electrically connected with a snap connection negative terminal located at the opposite end. The terminal 17 is generally identical to the positive terminal on conventional dry cell batteries so that the batteries 12a–c and cap 13 can be used with conventional electronic equipment. The adapter cap 14, on the other hand, is connected to the negative end 16 of the battery 12a. The cap 14 includes a negative terminal 18 at one end thereof which is electrically connected with a snap connection positive terminal located at the opposite end thereof. The terminal 18 is generally a small, circular indentation in the end of the cap 14. The terminal 18 is therefore generally identical to the negative terminal on conventional dry cell batteries so that the batteries 12a–c and cap 14 can be used with conventional electronic equipment.

Figure 4:
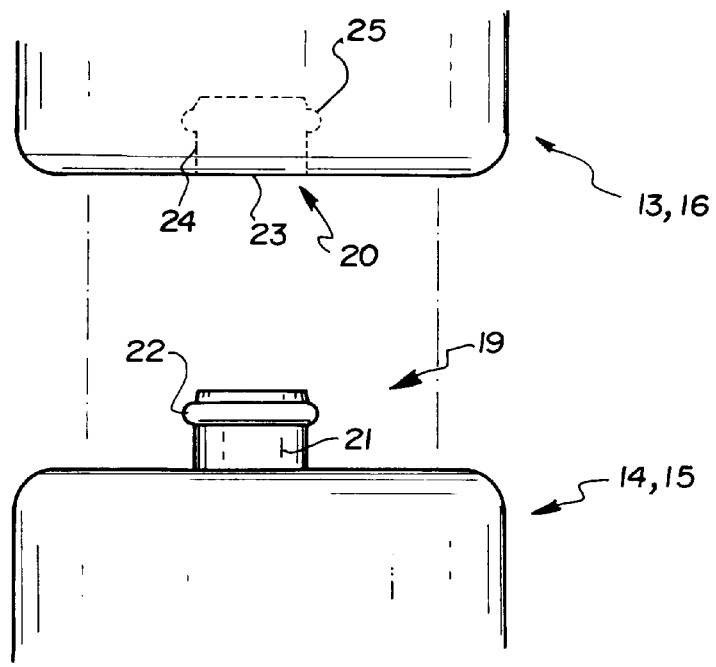
FIG. 4 is an exploded view showing one embodiment of a snap connection.

FIG. 4 illustrates one embodiment of the snap connection positive and negative terminals 19,20 used with the batteries 12a–c and adapter caps 13,14. The positive terminal 19 comprises a cylindrical male member 21 extending from either the end 15 of the batteries 12a–c or from the end of the cap 14. An annular rib 22 is formed on the male member 21 and extends continuously around the member 21. The negative terminal 20 comprises a female, cylindrical recess 23 extending into the body of the battery from the end 16, or extending into the body of the cap 13. The recess 23 is defined by a side wall 24, and an annular groove 25 is formed in the side wall 24. Thus it can be seen that the terminal 19 is connected to the terminal 20 by snap fitting the rib 22 into the groove 25.

Figure 5:
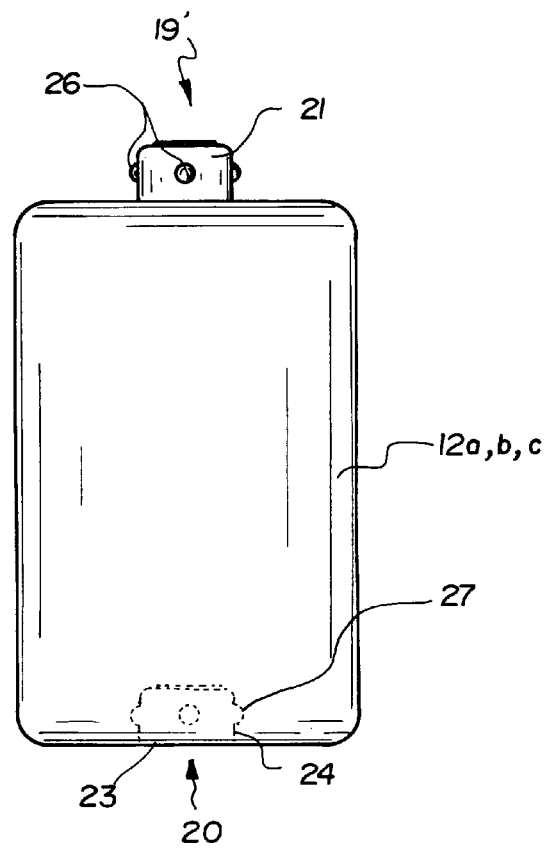
FIG. 5 is an exploded view showing another embodiment.

FIG. 5 illustrates a second embodiment which uses different snap connection positive and negative terminals 19', 20'. The positive terminal 19' includes the cylindrical male member 21, however a plurality of dimples 26 are spaced about the exterior of the member 21, in place of the rib 22. The negative terminal 20' includes the cylindrical recess 23 with the side wall 24 defining the recess. Instead of the groove 25, the side wall 24 includes a plurality of spaced indentations 27 for receiving the dimples 26 therein. This dimple and indentation snap fit type of connection could also be used with the adapter caps 13,14 as well.

In use, the positive terminal 19 of one of the batteries is inserted into the negative terminal 20 of another battery, with the rib or dimples fitting into the groove or indentations, so as to snap fit the batteries together. This procedure is repeated for all the batteries. The positive terminal on the battery 12c is then snap fit into the negative terminal on the battery cap 13, while the positive terminal on the adapter cap 14 is snap fit into the negative terminal on the battery 12a. The system 10 is then inserted into the electrical device to power the device, with the terminals 17,18 on the caps 13,14 functioning in a manner similar to the terminals on a conventional battery, or batteries.

Although the system 10 has been shown and described as using three batteries, a larger or smaller number of batteries could be used, including a single battery. Additionally, the adapter caps 13,14 could be eliminated, and the electronic device modified to snap fit connect directly with the battery/batteries.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A battery system comprising:

a plurality of batteries adapted for assembly into a linear array, each of said batteries including a battery body having first and second opposite ends and a perimeter wall, each of said batteries having a positive terminal located at the first end of said battery and a negative terminal located at the second end of said battery, said positive terminal comprising a substantially cylindrical male member projecting from the first end, said male member including at least one projection formed on an exterior surface thereof, and said negative terminal being defined by a substantially cylindrical female recess extending into the battery body from the second end, at least one cavity formed in a side wall defining the female recess wherein the protrusion of the male member is substantially equal to the depth of the female recess such that the perimeter walls of coupled batteries are substantially in contact with each other to produce a compact end to end configuration of the linear array of said plurality of batteries;

a first adapter cap positionable at a first end of the linear array of said plurality of batteries, said first adapter cap having first and second opposite ends, the first end of said first adapter cap having a generally flat configuration with minimal protrusion of a positive terminal and the second end of said first adapter cap having a negative terminal being defined by a female recess extending into the battery body from the second end and receiving the male member of an end battery of the linear array of said plurality of batteries, the female recess being defined by a side wall having at least one cavity; and a second adapter cap positionable at a second end of the linear array of said plurality of batteries, said second adapter cap having first and second opposite ends, the first end of said second adapter cap having a generally flat configuration and forming a negative terminal and the second end of said second adapter cap having a positive terminal being defined by a male member projecting from the second end and inserted into the female recess of an end battery of the linear array of said plurality of batteries, said male member of the second adapter cap including at least one projection formed on an exterior surface thereof and interlocking with the cavity in the side wall of the female recess of the end battery of said plurality of batteries;

wherein said projection comprises a continuous annular rib extending about the exterior surface of the male member;

wherein said cavity comprises a continuous annular groove in the side wall defining the female recess for receiving said continuous annular rib;

wherein each adapter cap has a diameter common with that of the batteries and a length that is a fraction of that of each battery.

2. A battery system comprising:

a plurality of batteries adapted for assembly into a linear array, each of said batteries including a battery body having first and second opposite ends and a perimeter wall, each of said batteries having a positive terminal located at the first end of said battery and a negative terminal located at the second end, said positive terminal of said battery comprising a substantially cylindrical male member projecting from the first end, said male member including at least one projection formed on an exterior surface thereof, and said negative terminal being defined by a substantially cylindrical female recess extending into the battery body from the second end, at least one cavity formed in a side wall defining the female recess wherein the protrusion of the male member is substantially equal to the depth of the female recess such that the perimeter walls of coupled batteries are substantially in contact with each other to produce a compact end to end configuration of the linear array of said plurality of batteries;

a first adapter cap positionable at a first end of the linear array of said plurality of batteries, said first adapter cap having first and second opposite ends, the first end of said first adapter cap having a generally flat configuration with minimal protrusion of a positive terminal and the second end of said first adapter cap having a negative terminal being defined by a female recess extending into the battery body from the second end and receiving the male member of an end battery of the linear array of said plurality of batteries, the female recess being defined by a side wall having at least one cavity; and a second adapter cap positionable at a second end of the linear array of said plurality of batteries, said second adapter cap having first and second opposite ends, the first end of said adapter cap having a generally flat configuration and forming a negative terminal and the second end of said second adapter cap having a positive terminal being defined by a male member projecting from the second end, said male member of the second adapter cap including at least one projection formed on an exterior surface thereof and being adapted for interlocking with the cavity in the side wall of the female recess of one of the batteries;

wherein said male member comprises at least two projections extending radially therefrom;

wherein said female recess comprises at least two cavities extending radially inward for receiving said projections; and wherein each adapter cap has a diameter common with that of the batteries and a length that is a fraction of that of each battery.

* * * * *